(12) United States Patent
Dwyer

(10) Patent No.: US 7,000,151 B2
(45) Date of Patent: Feb. 14, 2006

(54) SYSTEM AND METHOD FOR PROVIDING RUN-TIME TYPE CHECKING

(75) Inventor: Lawrence D. K. B. Dwyer, So San Fran, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 486 days.

(21) Appl. No.: 10/198,776

(22) Filed: Jul. 18, 2002

(65) Prior Publication Data

US 2004/0015748 A1 Jan. 22, 2004

(51) Int. Cl.
   *G06F 11/00* (2006.01)
(52) U.S. Cl. .......................... 714/38; 714/52; 717/126; 717/127; 717/141
(58) Field of Classification Search ................. 714/38, 714/52; 717/126, 127, 141
   See application file for complete search history.

(56) References Cited

U.S. PATENT DOCUMENTS

| 5,036,466 A * | 7/1991 | Fitzgerald et al. .......... 235/400 |
| 6,112,304 A * | 8/2000 | Clawson ..................... 713/156 |
| 6,360,362 B1 * | 3/2002 | Fichtner et al. ............. 717/168 |
| 6,665,813 B1 * | 12/2003 | Forsman et al. .............. 714/15 |
| 6,678,837 B1 * | 1/2004 | Quach et al. ................. 714/38 |
| 6,816,985 B1 * | 11/2004 | Ali-Santosa et al. .......... 714/38 |
| 2003/0188231 A1 * | 10/2003 | Cronce ........................ 714/52 |

\* cited by examiner

*Primary Examiner*—Robert Beausoliel
*Assistant Examiner*—Emerson Puente

(57) ABSTRACT

The present invention provides systems and methods for providing run-time type checking to prevent software errors. In architecture, a representative system includes a compiler that parses a program and further comprises a logic that generates a checksum for a block of code in the program, a logic that stores the checksum in the block of code, and a logic that inserts checksum instruction code into the block of code. The present invention can also be viewed as a method for providing run-time type checking to prevent software errors. A representative method operates by generating a checksum for a block of code in the program, and storing the checksum in the block of code. During execution of the program, a run-time checksum is generated for the block of code, and the block of code is executed if the checksum equals the run-time checksum, and the execution of the block of code is skipped if the checksum does not equals the run-time checksum.

19 Claims, 6 Drawing Sheets

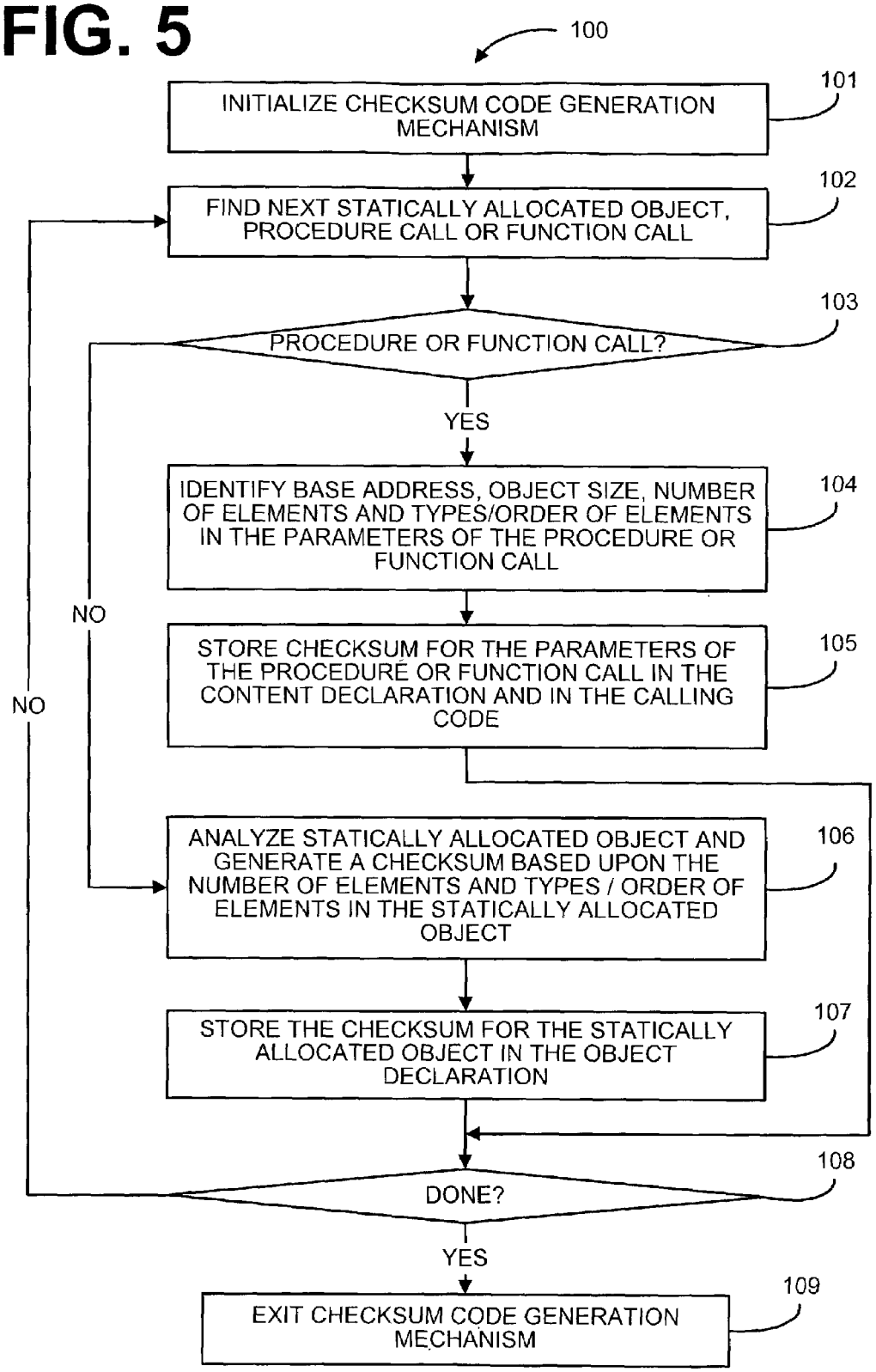

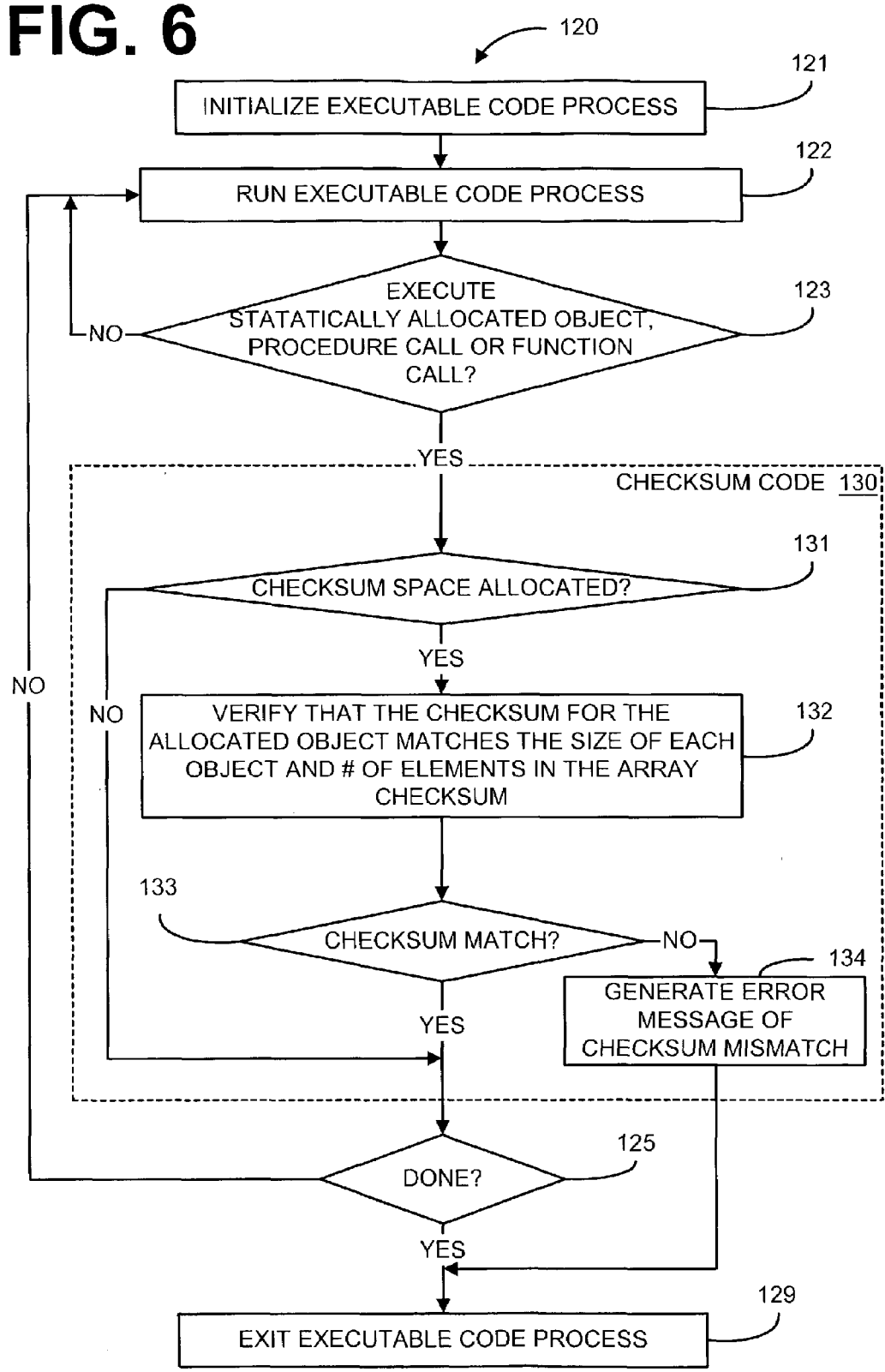

SYSTEM AND METHOD FOR PROVIDING RUN-TIME TYPE CHECKING

FIELD OF THE INVENTION

The present disclosure relates to systems and methods for executing computer programs. More particularly, the disclosure relates to systems and methods for providing run-time type checking to prevent software errors.

BACKGROUND OF THE INVENTION

In general, there are only two forms of a data object in a program, instances and references. An instance is the actual data object that can be created statically by the compiler or dynamically by the application. A reference of a data object occurs when a function accesses a data object whose instance was created elsewhere, such as another function.

Ordinarily, all programs are comprised of one or more functions. Larger programs may have the sources for many of the functions stored in separate files for convenience of maintenance and to reduce compile time. Since the source for these large programs are stored in separate files, they are compiled into relocatable object files (i.e., "." files), that have one-to-one correspondence with their source file. The compilation of these source files into the relocatable object files has a temporal nature. A relocatable object file derived from one source can be produced one month and a relocatable object file derived from another source file can be produced in another month. A resulting program can then be constructed by linking two relocatable object files at a third time without compromising the correctness of the program. This linking without compromising the correctness of the program is provided on the condition that none of the source files are changed between the compilation of the first source file and the compilation of the second source file.

This utilization of the relocatable object file derived from one source that can be produced in one month, and accessed and re-utilized in other modules at a later time normally will not have type checking errors caught by the linker. This is especially true during the development of the multiple code modules, in that the program can then have a high failure rate during execution. Therefore, there is a need for the developers to have the ability to have type checking performed at run-time to ensure run-time program correctness. This run-time type checking is needed because of inconsistent references to objects that change over time.

There is also a great need to make this type checking temporary, because once the developers have ensured the run-time correctness of the program there is additional overhead caused in space or time to perform this run-time type checking on an ongoing basis. This run-time type checking need not be performed when the program is in normal production or is being utilized by the end user. There is also the need to have the run-time type checking performed on an as needed basis (i.e. switchable) should errors occur during normal operation. This switchable run-time type checking would allow for the debugging of the program modules at a later time by switching the run-time type checking to an on-mode to assist in debugging of the programs. In order to have this switchable, there is a need to allocate the space required for a methodology to perform the run-time type checking at any time desired.

There is the additional problem that arises if one of the relocatable object files is produced from a first source, and there is a data object declaration in a second source. The problem arises where the data object, used by both of the source files, is changed and a second relocatable object file is produced from the second source file. Then, the two relocatable object files will contain data object declarations that are incompatible, but not detectably different.

Thus, a heretofore unaddressed need exists in the industry to address the aforementioned and/order inefficiencies and inadequacies of computer software.

SUMMARY OF THE INVENTION

The present disclosure relates to systems and methods for providing run-time type checking to prevent software errors. Briefly described, in architecture, a embodiment of the system includes a compiler that parses a program. The compiler further comprises logic that generates a checksum for a block of code in the program, logic that stores the checksum in the block of code, and logic that inserts checksum instruction code into the block of code.

The present invention can also be viewed as providing methods for providing run-time type checking to prevent software errors. In this regard, one such method can be broadly summarized by the following steps: (1) generating a checksum for a block of code in the program; (2) storing the checksum in the block of code; (3) computing a run-time checksum for the block of code during execution of the program; (4) executing the block of code if the checksum equals the run-time checksum; and (5) skipping execution of the block of code if the checksum does not equal the run-time checksum.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 5 is a flow chart illustrating functionality of the checksum code generation process of the present invention, as shown in FIGS. 1, 2 and 3.

FIG. 6 is a flow chart illustrating functionality of an example of the executable code process that operates the checksum code generated by the checksum code generation process, as shown in FIG. 5.

DETAILED DESCRIPTION

Figure 1:
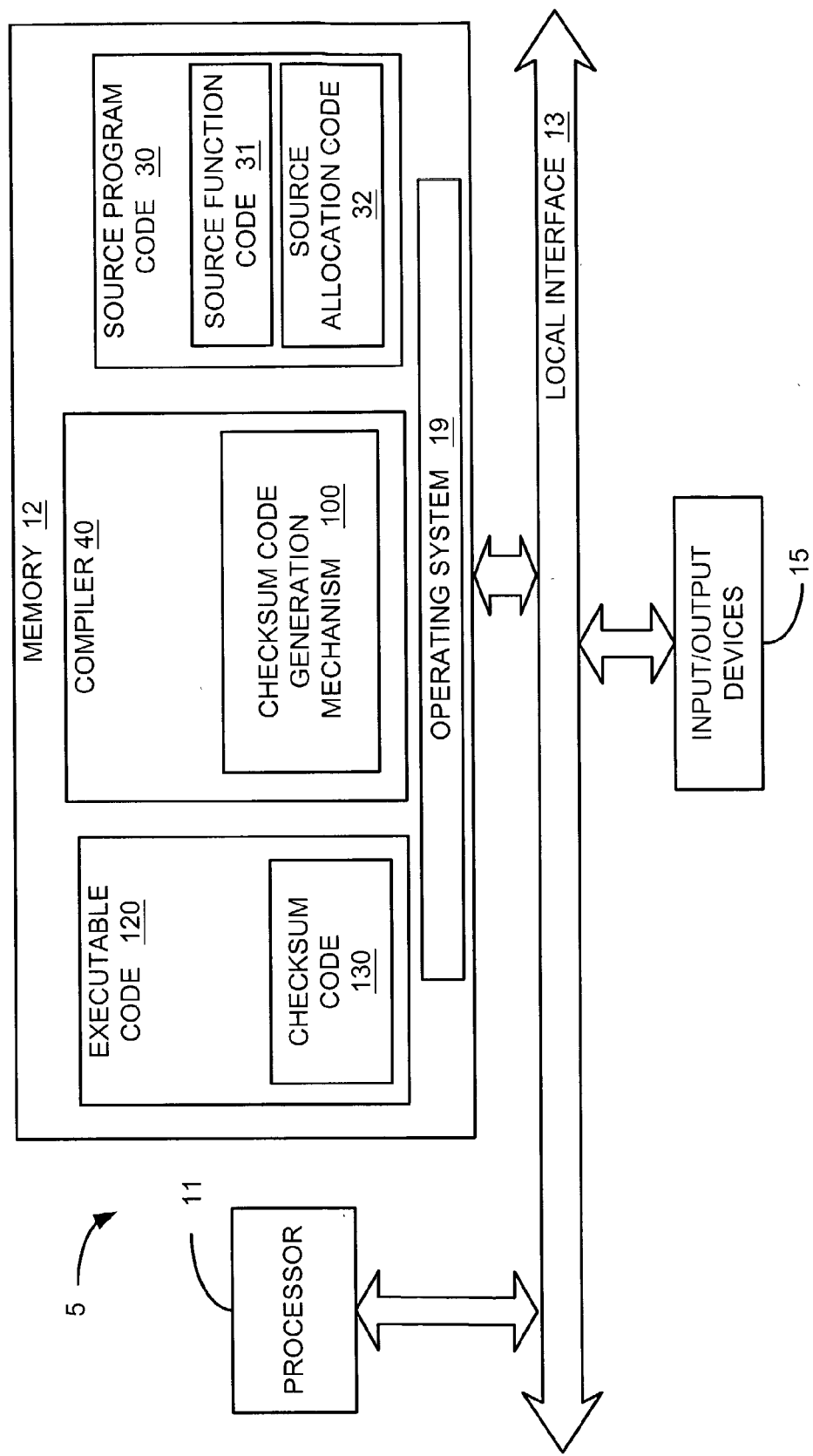
FIG. 1 is a block diagram of an embodiment at a system of the invention for providing run-time type checking to prevent software errors, including a compiler with a checksum code generation mechanism, source program code and executable code within a memory area.

Referring now in more detail to the drawings, in which like numerals indicate corresponding parts throughout the several views, the present invention will be described. While the invention is described in connection with these drawings, there is no intent to limit it to the embodiment or embodiments disclosed therein. On the contrary, the intent is to cover all alternatives, modifications, and equivalents included within the spirit and scope of the invention as defined by the appended claims.

The present invention relates to systems and methods for providing run-time type checking to prevent software errors. This run-time type checking can be particularly useful when multiple programmers are developing a system that includes multiple modules that are created by separate groups of programmers. When this type of system generation is utilized, there is a higher incidence of errors due to miscommunication of object reference definitions. This is particularly the case with respect to some computer programs that share object references that are created and modified by different programmers for their particular modules over time. Therefore, the data object may not be consistent across all modules. This can create a tremendous problem in that many computer languages during compilation and linking may not catch the type checking errors, and therefore the errors may only occur at run-time.

Embodiments of the present invention augment the compiler to add information (i.e. a checksum or signature) about the instance of an object that uniquely identifies the type and order of the elements that make up the object. A checksum is a value calculated to test data for the presence of errors that can occur when data is generated inconsistently from supposedly the same source. The checksum is calculated for a specific block of data by sequentially combining all bytes of data in the block with a series of arithmetic or logical operations. In the present invention, this checksum is placed before each object (i.e., in memory that has a lower address than the base address of the object). Optionally, this is done by the compiler when it allocates the object statically and can utilize known methods for example, to indicate whether or not a checksum is generated. An example of one method to establish whether or not a checksum is generated is the allocation of a flag or unique identifier. For example, a magic number to indicate that a checksum is available for this object.

When the application creates an object by calling a memory-allocation function (dynamic), special handling typically is needed because the allocation function is usually typeless, which means it allocates space but it does not know what object will be placed within the space. Through programming conventions, the program developer creates a new allocation function for each type of object that is dynamically created. This function allocates the space for the object and space for the checksum. It initializes the checksum, then returns a pointer to the space allocated for the object. Extensions to the language, via pragmas, can make this step of the allocation and initialization transparent to the program developer.

References to the object are passed from function to function by passing a "pointer" to the base (lowest) address of the object. This address is not a pointer to the checksum of the object. The compiler is augmented in at least some embodiments of this invention so that the compiler checks for the presence of the checksum stored in memory immediately before (lower address) the base address of the object. If the checksum is present, codes inserted in the function by the compiler compare the checksum of the external object against a checksum the compiler has computed for the object when the function was compiled. If the checksums match, the function proceeds. If the checksums do not match, an irrecoverable failure path can be executed.

By computing checksums when objects are created, and computing and comparing checksums when objects are referenced, there is an indication where any change made to the object between compiling one source module and compiling a second source module. This indication is then detectable by the application at run-time. Typically, compiler type checking only detects errors of code references at the time each module is compiled. Thus, the compiler cannot detect errors caused because of changes made to the object declaration between compiles. The present invention provides run-time type checking for potentially preventing software errors of this type.

Turning now to the drawings, FIG. 1 is a block diagram example of a general-purpose computer that can implement the checksum code generation mechanism of the invention. Generally, in terms of hardware architecture, as shown in FIG. 1, the computer 5 includes a processor 11, memory 12, and one or more input devices and/or output (I/O) devices (or peripherals) that are communicatively coupled via a local interface 13. The local interface 13 can be, for example but not limited to, one or more buses or other wired or wireless connections, as is known in the art. The local interface 13 may have additional elements, which are omitted for simplicity, such as controllers, buffers (caches), drivers, repeaters, and receivers, to enable communications. Further, the local interface 13 may include address, control, and/or data connections to enable appropriate communications among the aforementioned components.

The processor 11 is a hardware device for executing software that can be stored in memory 12. The processor 11 can be virtually any custom made or commercially available processor, a central processing unit (CPU) or an auxiliary processor among several processors associated with the computer 5, and a semiconductor based microprocessor (in the form of a microchip) or a macroprocessor. Examples of suitable commercially available microprocessors are as follows: an 80×86, Pentium or Itanium series microprocessor from Intel Corporation, U.S.A., a PowerPC microprocessor from IBM, U.S.A., a Sparc microprocessor from Sun Microsystems, Inc, a PA-RISC series microprocessor from Hewlett-Packard Company, U.S.A., or a 68xxx series microprocessor from Motorola Corporation, U.S.A.

The memory 12 can include any one or combination of volatile memory elements (e.g., random access memory (RAM, such as DRAM, SRAM, etc.)) and nonvolatile memory elements (e.g., ROM, hard drive, tape, CDROM, etc.). Moreover, the memory 12 may incorporate electronic, magnetic, optical, and/or other types of storage media. Note that the memory 12 can have a distributed architecture, where various components are situated remote from one another, but can be accessed by the processor 11.

The software in memory 12 may include one or more separate programs, each of which comprises an ordered listing of executable instructions for implementing logical functions. In the example of FIG. 1, the software in the memory 12 includes an operating system 19, a source program code 30 that includes source function code 31 and source allocation code 32, the checksum code generation mechanism 100 in the compiler 40, and executable code 120 that includes checksum code 130.

A non-exhaustive list of examples of suitable commercially available operating systems 19 is as follows: a Windows operating system from Microsoft Corporation, U.S.A., a Netware operating system available from Novell, Inc., U.S.A., an operating system available from IBM, Inc., U.S.A., any LINUX operating system available from many vendors or a UNIX operating system, which is available for purchase from many vendors, such as Hewlett-Packard Company, U.S.A., Sun Microsystems, Inc. and AT&T Corporation, U.S.A. The operating system 19 essentially controls the execution of other computer programs, such as the checksum code operation mechanism, and provides scheduling, input-output control, file and data management, memory management, and communication control and related services.

The checksum code generation mechanism 100 and the compiler 40 may be a source program, executable program (object code), script, or any other entity comprising a set of instructions to be performed. When a source program, then the program is usually translated via a compiler, assembler, interpreter, or the like, which may or may not be included within the memory 12, so as to operate properly in connection with the O/S 19. Furthermore, the checksum code generation mechanism 100 and the compiler 40 can be written as (a) an object oriented programming language, which has classes of data and methods, or (b) a procedure programming language, which has routines, subroutines, and/or functions, for example but not limited to, C, C++, Pascal, BASIC, FORTRAN, COBOL, Perl, Java, and Ada.

The I/O devices 15 may include input devices, for example but not limited to, a keyboard, mouse, scanner, microphone, etc. Furthermore, the I/O devices 15 may also include output devices, for example but not limited to, a printer, display, etc. Finally, the I/O devices 15 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer 5 is a PC, workstation, or the like, the software in the memory 12 may further include a basic input output system (BIOS) (omitted for simplicity). The BIOS is a set of essential software routines that initialize and test hardware at startup, start the O/S 19, and support the transfer of data among the hardware devices. The BIOS is stored in ROM so that the BIOS can be executed when the computer 5 is activated.

When the computer 5 is in operation, the processor 11 is configured to execute software stored within the memory 12, to communicate data to and from the memory 12, and to generally control operations of the computer 5 pursuant to the software. The checksum code generation mechanism 100 in the compiler 40 and the O/S 19 are read, in whole or in part, by the processor 11, perhaps buffered within the processor 11, and then executed.

When the checksum code generation mechanism 100 in the compiler 40 is implemented in software, as is shown in FIG. 1, it should be noted that can be stored on virtually any computer readable medium for use by or in connection with any computer related system or method. In the context of this document, a computer readable medium is an electronic, magnetic, optical, or other physical device or means that can contain or store a computer program for use by or in connection with a computer related system or method. The checksum code generation mechanism 100 and the compiler 40 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where checksum code generation mechanism 100 and the compiler 40 is implemented in hardware, the checksum code generation mechanism 100 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 2:
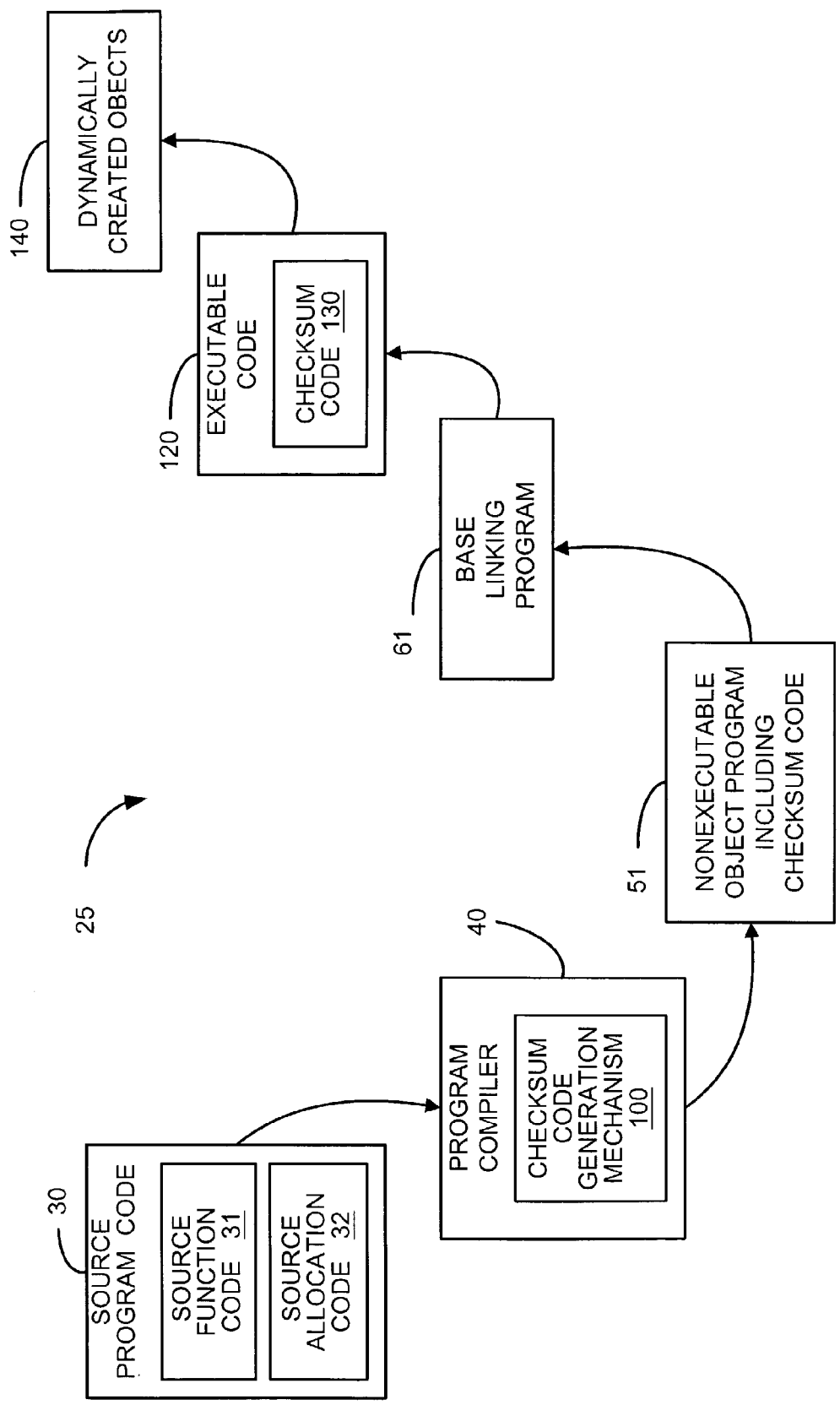
FIG. 2 is a block diagram illustrating an example of the process flow used to create an executable program that includes the run-time type checking system of the present invention.

Illustrated in FIG. 2 is a block diagram illustrating an example of the process to create and execute a program with the checksum code generation mechanism 100. First, the source program code 30 containing the source function code 31 and source allocation code 32 is input into the program compiler 40. The program compiler 40 containing the checksum code generation mechanism 100 generates a nonexecutable object program 51 that includes checksum code. The base-linking program 61 then processes the nonexecutable object program 51, including the checksum code. The base-linking program 61 generates an executable code 120 that includes the checksum code 130. During execution of the executable code 120, including the checksum code 130, the objects 140 are created. These objects 140 are utilized in the operation of the executable code 120. Some objects 140 are created with a checksum defined using checksum code 130.

Figure 3:
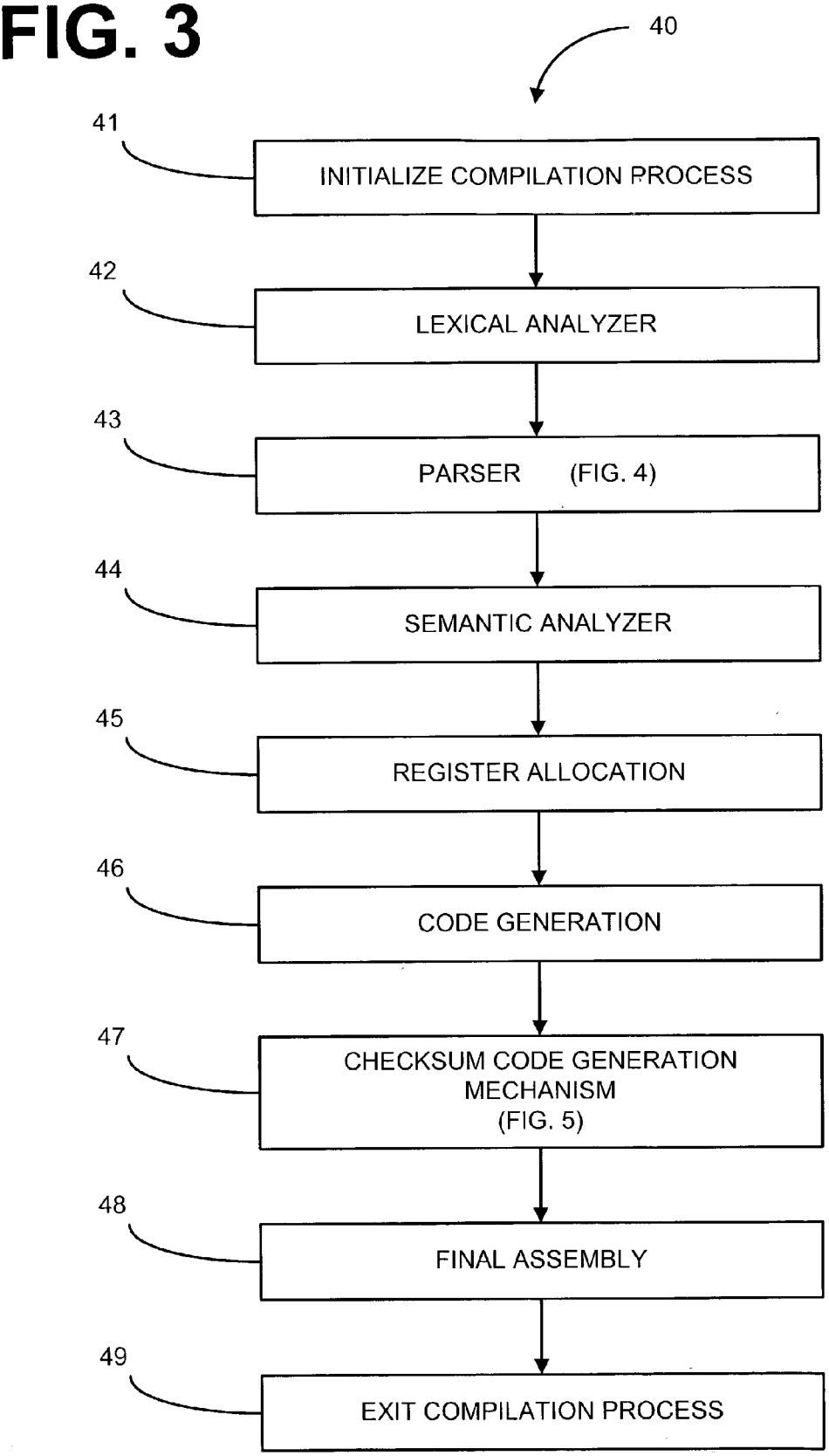
FIG. 3 is a flow chart illustrating functionality of an example of the compilation process utilizing the checksum code generation mechanism of the present invention, as shown in FIG. 1.

Illustrated in FIG. 3 is a flow chart depicting functionality of an example of the compilation process 40, including the checksum code generation mechanism 100 of the present invention. First, the compilation process 40 is initialized at step 41. At step 42, a lexical analyzer is performed on source code 30 (FIG. 2). At step 43, a parser is executed. The parser functionality is herein described in further detail with regard to FIG. 4.

At step 44, the schematic analyzer is operated and the register allocation is performed at step 45. At step 46, the code generation process is executed. The code generation process generates the nonexecutable object program 45. At step 47, the compilation process 40 then executes the checksum code generation mechanism that inserts checksum code into the nonexecutable object program 45. The checksum code generation mechanism is herein described in further detail with regard to FIG. 5.

Next, the final assembly of the nonexecutable object program 51 is performed. This final assembly of the nonexecutable object program includes the checksum code generated at step 47. At step 48, the compilation process 40 then exits.

Figure 4:
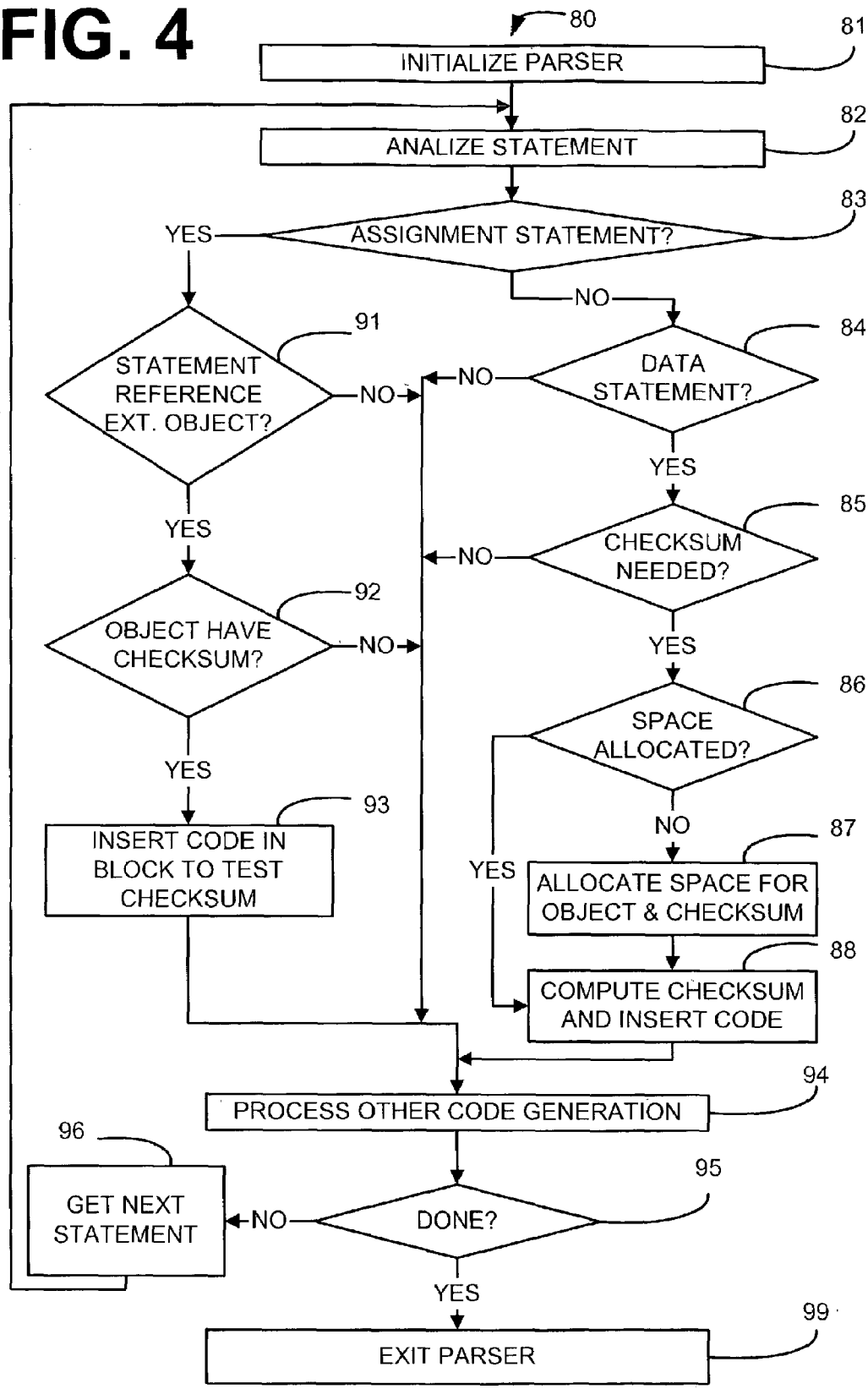
FIG. 4 is a flow chart illustrating functionality of an example of the parser utilized by the compilation process, as shown in FIG. 3.

Illustrated in FIG. 4 is a flow chart illustrating functionality of an example of the parser 80 that is within the compiler 40 that utilizes the checksum code generation mechanism 100 of the present invention. The parser 80 parses each of the statements within the source code 30 and allocates space for objects and checksums generated then and inserts code into a block to test the checksum if it is indicated that a checksum is to be generated for a particular object.

First, the parser is initialized and gets the first data statement at step 81. At step 82, the parser 80 then analyzes the code statement. At step 83, the parser 80 then determines whether the statement is an assignment statement. If at step 83, the parser 80 determines that the statement analyzed is not an assignment statement, then the parser 80 determines whether the statement analyzed (step 82) is a data statement at step 84. If it is determined at step 84 that the analyzed statement is not a data statement, then the parser 80 proceeds to step 94. However, if it is determined at step 84 that the statement analyzed at step 82 is a data statement, then the parser 80 checks whether a checksum generation is needed at step 85.

The indication by the programmer that a checksum needs to be generated for this data statement is generally performed in the pre-described manners defined by the particular program language used for the identified program code. For example, when utilizing the C program language for program generation, the developer, (i.e., the programmer), can utilize pragma statements or predetermined configured flags to indicate to the compiler whether or not a checksum is to be generated for this particular data statement.

The inventor contemplates that checksum generation can be made temporary. This temporary type checking can be useful because once the developers have ensured the run-time correctness of the program, the overhead attributed in space or time to perform continuous run-time type checking may be reallocated. Therefore, checksum generation may not need be performed on an ongoing basis when the program is in normal production or is being utilized by the end user.

The inventor contemplates at least two methods of controlling the intention to test the objects. However, it is understood that other methods, e.g., other known methods, can be utilized for controlling the intention to test the objects. The first is the presence of the pragma. If an object is identified by a pragma, it is tested. If it is not identified by a pragma, testing is not done. The second method contemplated by the inventor is a compiler switch. Regardless of whether a number of objects have a pragma set to test the object or not, an "override" switch given to the compiler when the compiler is invoked can cause all pragmas to be ignored, effectively removing them (in total) from the source file.

The inventor further contemplates that the run-time type checking can be performed on an as needed basis (i.e. switchable) should errors occur during normal operation. This switchable run-time type checking allows for the debugging of the program modules at a later time by switching the run-time type checking to an "on" mode to assist in debugging of the programs. In order to have this switchable checking, the space required for a methodology can be allocated at any time to perform the run-time type checking. This can be implemented with a global flag. When the compiler generates code (steps 88 and 93), as part of the sequence to test or compute and store a checksum, the global flag can be first tested to determine whether the developer or customer intends to test for checksum errors. If the flag is set, the generated code checks/generates the checksum. If the flag is not set, then the block of code that checks/generates the checksum can be skipped. It should be noted that this can be done at run-time, not compile time. The compiler can generate this test as part of the code it generates in steps 88 and 93 (FIG. 4).

It is still further contemplated by the inventor that checksum generation can also be turned "on" for some data statements in the program and turned "off" for others, therefore specifically targeting which data statements require the checksum generation. This enables the programmer to have complete control over what data statements are tested. This enables the developer to identify which data statements are more at risk for run-time errors due to invalid type referencing. The inventor also contemplates that this form of specified or focused type checking can be utilized in the assembler by assembly programs using end line assembler directives.

If it is determined at step 85 that a checksum is not needed, then the parser 80 then proceeds to step 94. However, if it is determined at step 85 that the data statement does need a checksum, then the parser 80 determines whether space is allocated for the generated checksum at step 86. If it is determined at step 86 that the space is allocated, then the parser 80 proceeds to step 88. However, if it is determined at step 86 that the space for the needed checksum is not allocated, then the parser 80 allocates the space for the object and checksum at step 87. At step 88, the parser 80 then computes the checksum and inserts the checksum code into the code block and then proceeds to step 94.

However, if it is determined at step 83 that the statement parsed is an assignment statement, the parser 80 then proceeds to step 91. At step 91, the parser 80 determines whether the statement references an external object. If it is determined at step 91 that the statement does not reference an external object, then the parser 80 proceeds to step 94 to process other code generation. However, if it is determined at step 91 that the statement referenced is an external object, the parser 80 then determines whether the external object has a checksum at step 92. If it is determined at step 92 that the object is not to have a checksum, the parser 80 then proceeds to step 94 to process other code generation. However, if it is determined at step 92 that the object has a checksum, then the parser 80 inserts the code in the code block to test the generated checksum, at step 93.

At step 94, the parser then processes other code generation as known in the art, and then determines if there are more statements to be processed. If there are more statements to be processed, then the parser 80 gets the next statement at step 96 and returns to repeat steps 82–95. However, if it is determined at step 95 that there are no more statements to be processed, then the parser 80 exits at step 99.

Illustrated in FIG. 5 is a flow chart depicting functionality of an example of the check code generation mechanism 100 of the present invention that is utilized by the compiler 40 (FIG. 3). First, the checksum code generation mechanism 100 is initialized at step 101. At step 102, the checksum code generation mechanism 100 then finds the first or next statically allocated object, procedure call or function call.

At step 103, the checksum code generation mechanism 100 determines whether the next allocated object, procedure call or function call is indeed a procedure or function call. If it is determined at step 103 that the next statically allocated block is a procedure or function call, then the checksum code generation mechanism 100 then identifies the base address, object size, number of elements, and type and order of elements in the procedure or function call, at step 104. At step 105, the checksum is stored for the procedure or function call in the content declaration for the procedure or function call. The checksum for the procedure or function call is also stored in the function or procedure calling code. Next, the checksum code generation mechanism 100 proceeds to step 108 to see whether there are more checksums to be generated.

However, if it is determined at step 103 that the next statically allocated object, procedure call or function call is not a procedure or function call, then the checksum code generation mechanism 100 analyzes the statically allocated object. The checksum code generation mechanism 100 then generates a checksum at step 106, based upon the analysis of the number of elements, and type and order of elements in the statically allocated object. At step 107, the checksum is stored for the statically allocated object in the object declaration.

At step 108, the checksum code generation mechanism determines whether there is more checksum code to be generated for statically allocated object, procedure or function calls. If it is determined at step 108 that there are more statically allocated object, procedure or function calls, then the checksum code generation mechanism 100 returns to repeat steps 102 through 108. However, if it is determined at step 108 that there are no more statically allocated object, procedure or function calls for checksums to be generated, then the checksum code generation mechanism 100 exits at step 109.

Illustrated in FIG. 6 is a flow chart depicting functionality of an example of the executable code process 120 that includes the checksum code 130 generated by the checksum code generation mechanism 100 of the present invention. First, the executable code process 120 is initialized at step 121. At step 122, the executable code process is run. At step 123, the executable code process 120 determines whether the executed statement is a statically allocated object procedure or function call. If it is determined at step 123 that the next statement is not a statically allocated object, a procedure or a function call, then the executable code process 120 returns to repeat steps 122 and 123.

However, if it is determined at step 123 that the next code executed is a statically allocated object, procedure or function call, then at step 131, the executable code process 120 runs the checksum code 130. The checksum code 130 determines whether there is checksum space allocated for the statically allocated object, procedure or function call. If it is determined at step 131 that there is checksum space allocated for the statically allocated object, procedure or function call, then the checksum code 130 verifies the checksum in the statically allocated object, procedure or function call. The checksum is verified to make sure that it matches the size of each object and the number of elements in the array for the generated checksum at step 132. The checksum code 130 then proceeds to identify whether the checksum in the statically allocated object, procedure or function call matches the checksum in the array at step 133. At step 134, the checksum code 130 then determines whether the checksums match. If it is determined at step 134 that the checksums do not match, then the checksum code 130 generates an error message of checksum mismatch at step 135 and then exits at step 129. However, if the checksum code 130 determines at step 134 that the checksums do match, then the executable code process 120 resumes processing.

The executable code process 120 then determines whether it is done processing code statements at step 128. If it is determined at step 128 that there are more code statements to be processed, then the executable code process 120 returns to repeat steps 122 through 128. However, if it is determined at step 128 that there is no more executable code to be run, then the executable code process 120 exits at step 129.

While particular embodiments of the invention have been disclosed in detail in the foregoing description and drawings for purposes of example, it will be understood by those skilled in the art that variations and modifications thereof can be made without departing from the scope of the invention as set forth in the following claims.

What is claimed is:

1. A method for providing run-time type checking comprising steps of:
   generating a checksum corresponding to the form of an object in a program;
   storing the checksum in the object;
   computing a run-time checksum corresponding to the form of the object during execution of the program;
   executing the object if the checksum equals the run-time checksum; and
   skipping execution of the object if the checksum does not equal the run-time checksum.

2. The method of claim 1, wherein the generating a checksum step further comprises:
   allocating area for the generated checksum.

3. The method of claim 1, wherein the generating a checksum step further comprises:
   inserting the checksum in the object.

4. The method of claim 1, further comprising the step of:
   inserting checksum instruction code into the object.

5. The method of claim 1, wherein the generating a checksum step further comprises:
   using a parameter to generate the checksum, wherein the parameter comprises a base address of the object, number of elements in the object, type of the elements in the object, and order of the elements in the object.

6. A system for providing run-time type checking, comprising:
   means for generating a checksum corresponding to the form of an object in a program;
   means for storing the checksum in the object; and
   means for computing a run-time checksum corresponding to the form of the object during execution of the program, wherein the computing means executes the object if the checksum equals the run-time checksum, and skips execution of the object if the checksum does not equal the run-time checksum, said means for computing comprising a processor.

7. The system of claim 6, wherein the generating means further comprises:
   means for allocating area for the generated checksum.

8. The system of claim 6, wherein the generating means further comprises:
   means for inserting the checksum in the object.

9. The system of claim 6, wherein the generating means further comprises:
   means for inserting checksum instruction code into the object.

10. The system of claim 6, wherein the checksum is generated using a parameter, wherein the parameter comprises a base address of the object, number of elements in the object, type of the elements in the object, and order of the elements in the object.

11. A computer readable electronic storage medium executing computer readable instructions for providing run-time type checking, comprising:
   logic for generating a checksum corresponding to the form of an object in a program;
   logic for storing the checksum in the object; and
   logic for computing a run-time checksum corresponding to the form of the object during execution of the program, wherein the computing logic executes the object if the checksum equals the run-time checksum, and skips execution of the object if the checksum does not equal the run-time checksum.

12. The computer readable medium of claim 11, wherein said logic for generating a checksum further comprises:
   logic for allocating area for the checksum.

13. The computer readable medium of claim 11, wherein said logic for generating a checksum further comprises:
   logic for inserting the checksum in the object.

14. The computer readable medium of claim 11, wherein said logic for generating a checksum further comprises:
   logic for inserting checksum instruction code into the object.

15. The computer readable medium of claim 14, wherein the checksum is generated using a parameter, wherein the parameter comprises a base address of the object, number of elements in the object, type of the elements in the object, and order of the elements in the object.

16. A system for providing run-time type checking, comprising:
   a compiler that parses a program, wherein the compiler further comprises:
      logic that generates a checksum corresponding to the form of an object in the program;
      logic that stores the checksum in the object; and
      logic that inserts checksum instruction code into the object.

17. The system of claim 16, wherein the compiler further comprises:
   logic that allocates area in the object for the checksum.

18. The system of claim 16, wherein the compiler further comprises:
   logic that inserts the checksum in the object.

19. The system of claim 16, wherein the checksum is generated using a parameter, wherein the parameter comprises a base address of the object, number of elements in the object, type of the elements in the object, and order of the elements in the object.

* * * * *